(12) United States Patent
Iida et al.

(10) Patent No.: US 10,557,050 B2
(45) Date of Patent: Feb. 11, 2020

(54) METALLIC IMAGE FORMING METHOD

(71) Applicant: CANON KABUSHIKI KAISHA, Tokyo (JP)

(72) Inventors: Kenichi Iida, Kawasaki (JP); Taketoshi Okubo, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 15/310,669

(22) PCT Filed: Apr. 28, 2015

(86) PCT No.: PCT/JP2015/002290
§ 371 (c)(1),
(2) Date: Nov. 11, 2016

(87) PCT Pub. No.: WO2015/174041
PCT Pub. Date: Nov. 19, 2015

(65) Prior Publication Data
US 2017/0073536 A1  Mar. 16, 2017

(30) Foreign Application Priority Data

May 14, 2014 (JP) ................................. 2014-100459

(51) Int. Cl.
| | | |
|---|---|---|
| *B41J 2/01* | (2006.01) | |
| *C09D 11/40* | (2014.01) | |
| *C09D 11/107* | (2014.01) | |
| *C09D 11/32* | (2014.01) | |
| *C09D 5/29* | (2006.01) | |

(52) U.S. Cl.
CPC .............. *C09D 11/40* (2013.01); *B41J 2/01* (2013.01); *C09D 5/29* (2013.01); *C09D 11/107* (2013.01); *C09D 11/32* (2013.01)

(58) Field of Classification Search
None
See application file for complete search history.

(56) References Cited

U.S. PATENT DOCUMENTS

| | | | | |
|---|---|---|---|---|
| 5,312,865 A * | 5/1994 | Hoefer | ............... | C08G 18/0819 524/591 |
| 6,299,979 B1 * | 10/2001 | Neubauer | ................ | C08J 3/126 106/499 |
| 8,859,061 B2 * | 10/2014 | Kasperchik | .......... | B41M 5/5218 106/31.65 |
| 8,931,872 B2 * | 1/2015 | Yamashita | ............. | B41J 2/2103 347/15 |

(Continued)

FOREIGN PATENT DOCUMENTS

| | | |
|---|---|---|
| JP | 2000-256357 A | 9/2000 |
| JP | 2001-253882 A | 9/2001 |

(Continued)

*Primary Examiner* — Erica S Lin
(74) *Attorney, Agent, or Firm* — Canon U.S.A. Inc., IP Division

(57) ABSTRACT

A metallic image forming method is a method for forming a metallic image with a metallic ink containing an organic coloring agent capable of exhibiting a metallic color on a recording medium provided with an undercoat layer thereon having a black color or an opposite color to the color of diffused light from the metallic ink. The method includes applying the metallic ink onto the recording medium so as to cover at least part of the undercoat layer.

20 Claims, 2 Drawing Sheets

(56) References Cited

U.S. PATENT DOCUMENTS

| | | | |
|---|---|---|---|
| 2008/0092773 A1* | 4/2008 | Matsuyama | B41J 2/17513 106/31.65 |
| 2010/0009136 A1* | 1/2010 | Oyanagi | C09D 11/322 428/195.1 |
| 2010/0053267 A1* | 3/2010 | Seishin | B41J 2/2107 347/43 |
| 2010/0167023 A1* | 7/2010 | Oyanagi | C09D 11/322 428/195.1 |
| 2010/0177354 A1* | 7/2010 | Yoshida | B41J 11/0015 358/3.01 |
| 2010/0177357 A1* | 7/2010 | Yoshida | B41J 2/2114 358/3.21 |
| 2011/0216968 A1* | 9/2011 | Fillion | G06K 9/00 382/163 |
| 2012/0033263 A1* | 2/2012 | Rich | B41M 5/0023 358/3.06 |
| 2012/0194621 A1 | 8/2012 | Ikegami | |
| 2012/0288645 A1* | 11/2012 | Zhou | B41M 5/0035 428/32.34 |
| 2013/0208035 A1* | 8/2013 | Okumura | B41J 2/195 347/7 |
| 2014/0220319 A1* | 8/2014 | Koike | B41M 5/0017 428/207 |

FOREIGN PATENT DOCUMENTS

| | | |
|---|---|---|
| JP | 2002-285049 A | 10/2002 |
| JP | 2004-315545 A | 11/2004 |
| JP | 2005-281330 A | 10/2005 |
| JP | 2006-249259 A | 9/2006 |
| JP | 2010-47686 A | 3/2010 |
| JP | 2012-176602 A | 9/2012 |
| JP | 2014-62242 A | 4/2014 |
| WO | 2014/021405 A2 | 2/2014 |

* cited by examiner

[Fig. 1]
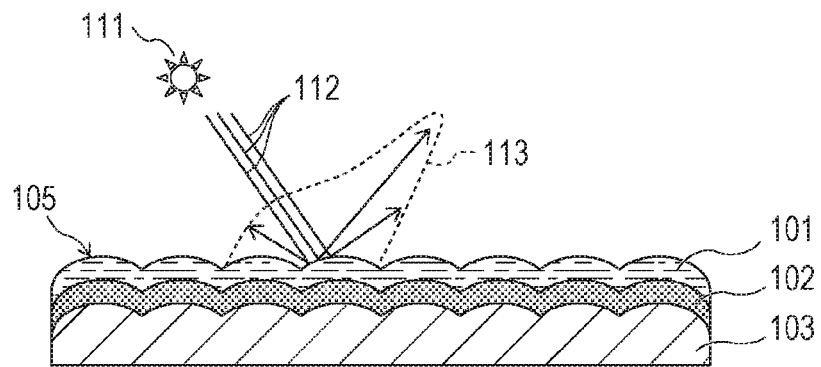
[Fig. 2]
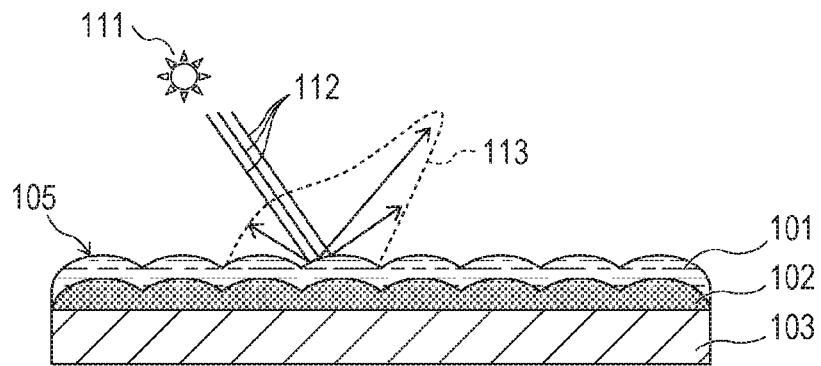
[Fig. 3]
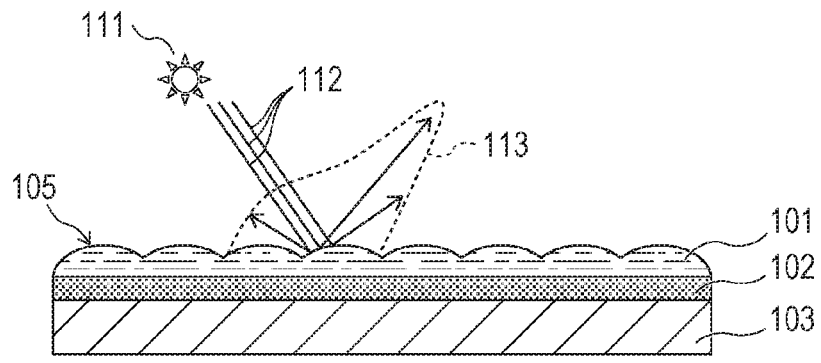

[Fig. 4]
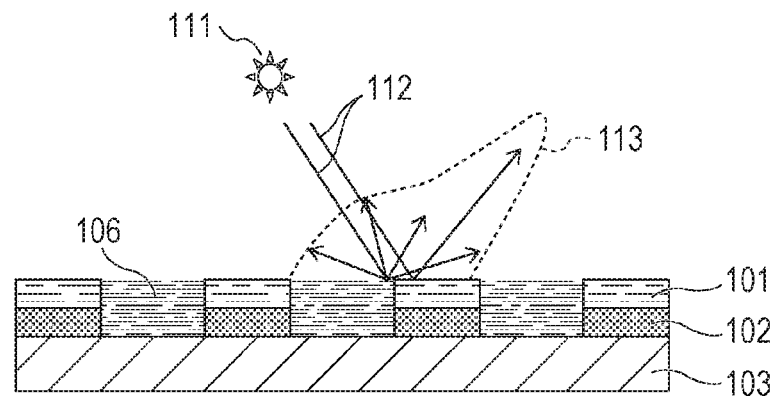
[Fig. 5]
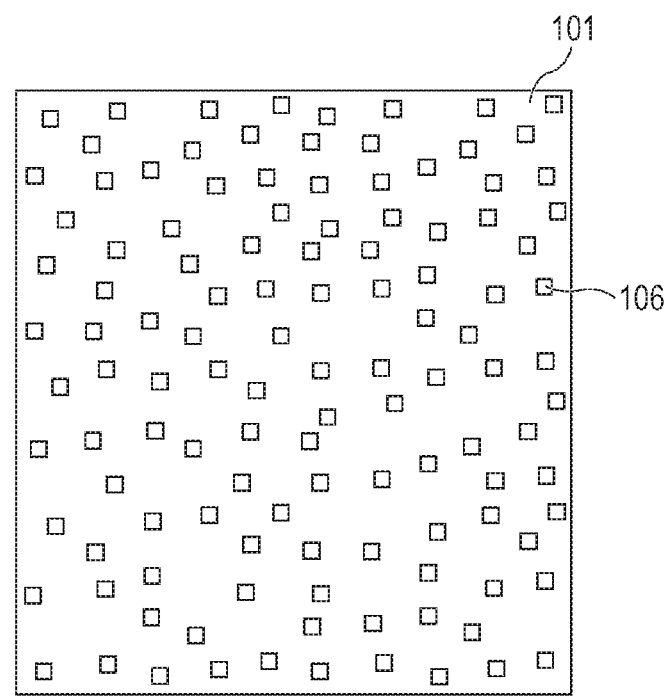

METALLIC IMAGE FORMING METHOD

TECHNICAL FIELD

The present invention relates to a metallic image forming method.

BACKGROUND ART

In order to represent an image including a colored portion exhibiting a metallic color in a printed article such a printed advertisement or a photograph, organic coloring agents capable of exhibiting metallic color have been studied (PTLs 1 to 5).

CITATION LIST

Patent Literature

PTL 1: Japanese Patent Laid-Open No. 2000-256357
PTL 2: Japanese Patent Laid-Open No. 2001-253882
PTL 3: Japanese Patent Laid-Open No. 2006-249259
PTL 4: Japanese Patent Laid-Open No. 2004-315545
PTL 5: International Publication No. WO 2014/021405

SUMMARY OF INVENTION

The present inventors prepared an ink containing an organic coloring agent capable of exhibiting a metallic color and formed an image on a recording medium using the ink. The metallic appearance of the resulting image was however not satisfactory, and a desired metallic image was not formed.

The present invention provides a metallic image forming method that can produce a metallic image having a satisfactorily metallic appearance.

According to an aspect of the invention, a metallic image forming method is provided for forming a metallic image with an ink containing an organic coloring agent capable of exhibiting a metallic color on a recording medium provided with an undercoat layer having a black color or an opposite color to the color of diffused light from the ink. The method includes applying the ink onto a recording medium so as to cover at least part of the undercoat layer.

Further features of the present invention will become apparent from the following description of exemplary embodiments with reference to the attached drawings.

BRIEF DESCRIPTION OF DRAWINGS

FIG. 1 is a sectional view illustrating an image forming method according to an embodiment in which the recording medium has an uneven profile.

FIG. 2 is a sectional view illustrating an image forming method according to an embodiment in which the undercoat layer has an uneven profile.

FIG. 3 is a sectional view illustrating an image forming method according to an embodiment in which a metallic color coating formed only with a metallic ink (first ink) has an uneven profile.

FIG. 4 is a sectional view illustrating an image forming method according to an embodiment in which areas 101 and areas 106 are separately formed.

FIG. 5 is a plan view illustrating an image forming method according to an embodiment in which portion 101 and portions 106 are separately formed.

DESCRIPTION OF EMBODIMENTS

The present invention will be further described using exemplary embodiments.

The present inventors investigated the reason why a satisfactorily metallic image is not formed by merely applying an ink containing an organic coloring agent capable of exhibiting a metallic color (hereinafter simply referred to as metallic ink or first ink). As a result, the present inventors found that the reason is muddiness of the metallic color resulting from the phenomenon in which specularly reflected light (light reflected at the same angle as, but in a specular direction to incident light) from the image exhibits a metallic color while diffused light reflected at angles different from the specularly reflected light has a hue different from the metallic color. Accordingly, the present inventors thought that a desired metallic color can be produced by reducing diffused light, and thus reached the concept of the invention.

According to an embodiment of the present invention, a desired metallic appearance can be produced by previously forming an "undercoat layer" capable of reducing diffused light in the region, at least in part, to which a metallic ink will be applied. The undercoat layer capable of reducing diffused light may have a black color or a color opposite to the color of the diffused light from the metallic ink. The black undercoat layer absorbs the diffused light from the metallic ink, and the undercoat layer having the opposite color cancels the diffused light from the metallic ink. Thus the diffused light is reduced.

The metallic image forming method and materials used therein will now be described using exemplary embodiments.

Metallic Image Forming Method
Application of Ink

The method includes the step of applying an ink to a recording medium. In this step, the ink is applied so as to cover at least part of an undercoat layer having black color or a color opposite to the color of the diffused light from the ink. The recording medium and the ink will be described.

Recording Medium

Recording media that can be used in the metallic image forming method of the present invention include surface-treated permeable media, such as plain paper, coat paper, art paper, and cast-coated paper. Impermeable recording media may be used, such as a vinyl chloride sheet, a PET film, and other polymer films. The recording medium is not limited to these, and may be a cloth, wood, plastic or metal sheet.

Also, the recording medium may be opaque or transparent. The term "transparent recording medium" used herein refers to a recording medium made of any of the above-cited materials and having a transmittance to light, such as such as ultraviolet light, visible light, or infrared light, having wavelengths at least in a certain range. When a recording medium has a high transmittance, the amount of light transmitted through the recording medium is larger than that of light reflected from the recording medium. For example, when visible light is incident on a "transparent" recording medium made of any of the above-cited materials, the recording medium may be colorless or colored. An opaque recording medium used herein refers to a recording medium other than the above-described transparent recording medium. For example, opaque recording media include vinyl chloride sheets, PET films and other polymer films, plastic media, and glass media. If an opaque recording medium is used, the ink is applied to the side of the opaque recording medium on which an undercoat layer has been formed. On the other hand, if a transparent recording medium is used, the ink is applied to the side of the transparent recording medium opposite the side on which the undercoat layer has been formed.

Ink (Metallic Ink)

The ink, together with the undercoat layer, can form a metallic image. The ink is a metallic ink containing an organic coloring agent capable of exhibiting a metallic color on the recording medium. The "metallic color" mentioned herein refers to a color having metallic gloss, such as gold, silver, or copper color. The organic coloring agent mentioned herein is an organic compound capable of absorbing or emitting visible light to give a color to an object, and may be a dye or a pigment. Advantageously, the organic coloring agent is a pigment. Organic coloring agents capable of exhibiting metallic color include azamethine-based coloring agents, cyanine-based coloring agents, merocyanine-based coloring agents, xanthene-based coloring agents, azo-based coloring agents, quinacridone-based coloring agents, triphenylmethane-based coloring agents, phthalocyanine-based coloring agents, pyrrole-based coloring agents (PTL 1 and PTL 2), aniline-based coloring agents (PTL3 and PTL 4), and thiophene-based coloring agents (PTL 5). These organic coloring agents may be used singly or in combination.

Whether or not an organic coloring agent can exhibit a metallic color can be checked by the following procedure. First, a film of the organic coloring agent is formed on a recording medium having a smooth surface (recording medium having an arithmetic average surface roughness Ra of 0.001 μm or less, such as quartz glass wafer). Such a film may be formed by, for example, dip coating, spin coating, bar coating, or vapor deposition. Then, the angle dependence of the lightness L*, which represents brightness, of the resulting film is measured with a goniospectrophotometer, such as GSP-2 (manufactured by Murakami Color Research Laboratory). When the value of definition expressed by equation (A): definition=L/w is 0.2 or more, the organic coloring agent is determined to be capable of exhibiting a metallic color. In equation (A), L represents the highest value of the lightnesses L* measured at the light-receiving portion of the goniospectrophotometer, and w represents the width between the light-receiving angles at the two points at which the lightness is a half of L, (L/2). Since the lightness of a film having a definition of 0.2 or more varies depending on the viewing angle, the film appears metallic-colored. From the viewpoint of exhibiting more satisfactory metallic color, the definition is desirably 0.4 or more, and preferably 1.0 or more.

The ink may further contain a resin, an organic solvent, a surfactant and water. The ink may be an aqueous ink containing 50% by mass or more of water, or a nonaqueous ink containing less than 50% by mass of water. Advantageously, the ink further contain a pH adjuster, an antifoaming agent, a rust preventive, a preservative, a fungicide, an antioxidant, an antireductant, an evaporation accelerator, a chelating agent, a water-soluble resin, and other additives, as needed. Although all the constituents in the ink except the organic coloring agent may have color, it is advantageous that the constituents do not reduce the degree of metallic color.

The layer or coating of the metallic ink formed on the recording medium may have a thickness of 0.01 μm or more, preferably 0.03 μm or more, and more preferably 0.05 μm or more. Also, the thickness of this layer may be 100 μm or less, preferably 10 μm or less, and more preferably 1 μm or less.

Formation of Undercoat Layer

Before the step of applying the ink, an undercoat layer having a black color or a color opposite to the color of the diffused light from the ink may be formed on the recording medium. More specifically, this operation can be performed by applying an ink (hereinafter referred to as undercoat ink) having a black color or a color opposite to the color of diffused light from the metallic ink. The undercoat ink will now be described.

Undercoat Ink

The undercoat layer having a black color or a color opposite to the color of diffused light from the metallic ink can be formed by applying an undercoat ink having black color or a color opposite to the color of diffused light from the metallic ink onto the recording medium.

If a black ink is used as the undercoat ink, the undercoat ink may contain a black coloring material. Alternatively, the black undercoat layer may be formed by mixing color inks of yellow, magenta, cyan and the like, without using a black color material. The term "black color" mentioned herein implies that a 100%-duty solid pattern sample formed with the black color ink on a recording medium absorbs light having wavelengths over the entire range of 380 nm to 780 nm. In addition, when the solid pattern sample is measured with an integrating sphere spectrocolorimeter in a specular component excluded mode under a D50 environment (this measurement adheres to the method specified in condition C of JIS Z 8722, using the measurement principle specified in an international standard ISO 7724/1, and also adheres to the colorimetry specified in CIE No. 15 of International Commission on Illumination and to ASTM (American Society for Testing and Materials) E1164 standard), the lightness L* of the CIE L*a*b* color system is preferably 35 or less, more preferably 25 or less, and still more preferably 15 or less. When the lightness L* is 35 or less, diffused light can be satisfactorily reduced, and accordingly, a natural metallic image can be formed.

If the undercoat ink is an ink having an opposite color to the color of diffused light from the metallic ink, the undercoat ink may contain a coloring material capable of exhibiting the opposite color to the color of diffused light from the metallic ink. The term "diffused light" used herein refers to light rays produced by reflection of rays incident on an image at a specific incident angle, except for specular reflection (mirror reflection). For example, the color of diffused light having wavelengths in the range of 380 nm to 780 nm can be measured in a specular component excluded mode of an integrating sphere spectrocolorimeter under a D50 environment. The "opposite color" refers to a hue satisfying the following relational expression (1):

Hue angle of diffused light from the metallic ink+ 162°≤hue angle of diffused light from the undercoat ink having the opposite color≤hue angle of diffused light from the metallic ink+ 198°.

It is advantageous that the undercoat ink has such an opposite color as is complementary to the CIE L*a*b* chromaticity coordinates a* and b* of the diffused light from the metallic ink.

Advantageously, the CIE L*a*b* chromaticity coordinates a* and b* of the opposite color (hereinafter represented by $a_2^*$ and $b_2^*$) and the chromaticity coordinates a* and b* of the metallic ink (hereinafter represented by $a_1^*$ and $b_1^*$) satisfy the following relationship:

$$|\{(a_1^*)^2+(b_1^*)^2\}^{1/2}-\{(a_2^*)^2+(b_2^*)^2\}^{1/2}|\leq 30$$

The left side of the relational expression represents the difference between the distances from the origin (a*=0, b*=0) in the a*b* plane of the CIE L*a*b* color system. As the difference is smaller or closer to 0, the opposite color can reduce diffused light more effectively, and the resulting metallic image has more satisfactory metallic appearance.

From the viewpoint of producing more satisfactory metallic appearance, a black ink is advantageous as the undercoat ink.

The colors of diffused light from the metallic ink, the undercoat ink and the metallic image on the recording medium can be measured in a specular component excluded (SCE) mode of a spectrocolorimeter CM-2600d (manufactured by Konica Minolta). For the measurement in a specular component excluded mode of an integrating sphere spectrocolorimeter, a D50 light source (specified in JIS Z 8720: 2012), which is suitable for measuring printed articles, is suitably used. The light source for measuring color, however, may be an A light source, a C light source, or D65 light source (each specified in JIS Z 8720:2012) without being limited to the D50 light source. Other light sources, such as F2, F6, F7, F8, F10, and F12, may also be used depending on the recording conditions or environment. When a black ink is used as the undercoat ink, any light source can produce the same effect.

The undercoat ink may contain the same constituents as in the metallic ink, except for the organic coloring agent. Although all the constituents in the undercoat ink except the coloring material may have color, it is advantageous that the constituents do not vary the hue deriving from the coloring material.

The layer of undercoat ink formed on the recording medium may have a thickness of 0.001 µm or more, preferably 0.01 µm or more, and more preferably 0.05 µm or more. Also, the thickness of this layer may be 10 µm or less, preferably 5 µm or less, and more preferably 1 µm or less. The thickness may be measured by any method, as long as thicknesses of the order of micrometers can be measured. For example, an ink pattern of image is cut to expose a cross section, and the thickness of the cross section is measured through a scanning electron microscope.

Other Steps

The image forming method of an embodiment may include the step of applying an ink other than the metallic ink or the undercoat ink (hereinafter referred to as third ink).

Third Ink

Desirably, the third ink has the same hue as the metallic ink, but does not exhibit metallic color. "The same hue as the metallic ink" means the following.

First, the color of an image formed by applying only the metallic ink onto the recording medium is measured in the range of wavelengths of 380 nm to 780 nm in a specular component included (SCI) mode of an integrating sphere spectrocolorimeter under a D50 environment. Then, the color of an image formed by applying only the third ink onto the recording medium is measured in a specular component excluded (SCE) mode of with the integrating sphere spectrocolorimeter under a D50 environment. If the CIE chromaticity coordinates a* and b* of the third ink are substantially the same as those of the metallic ink, it is determined that the third ink has the same hue as the metallic ink. The expression "substantially the same" in this case implies that the hue of the third ink may have a difference from the hue of the metallic ink to the extent that it cannot be visually detected. For example, a portion colored with the third ink may have a difference within ±18 degrees from the hue angle of the coating of the metallic ink when measured by the above-described method. The expression "not exhibit metallic color" used above means that incident light on a recording medium exhibits a color by being diffusely reflected in various directions without being specularly reflected.

The measurement in a specular component exclusive mode of an integrating sphere spectrocolorimeter can be performed in the SCE (specular component exclusive) mode of a spectrocolorimeter CM-2600d (manufactured by Konica Minolta) as described above. Also, the measurement by the specular component included mode can be performed in the SCI (specular component included) mode of the same spectrocolorimeter. The light source used in the SCE and SCI modes can be appropriately selected depending on the measurement conditions or environment.

The form of the third ink is not particularly limited, and may be a mixture of some of the known CMYK process color ink compositions without being limited to a single composition. The CMYK process color inks may be separately ejected from an ink jet head to form a colored portion having the same hue as a coating of the metallic ink for having a hue angle in the above range). It is not particularly limited when the third ink is applied. Hence, the third ink may be applied before or after applying the undercoat ink. The third ink may contain the same constituents as the metallic ink, except for the organic coloring agent. Although all the constituents in the third ink except the coloring agent may have color, it is advantageous that the constituents do not vary the hue deriving from the coloring material.

How to Expand View Angle for Metallic Color

The view angle within which metallic color can be viewed (hereinafter referred to as the view angle for metallic color) may be expanded by the image forming method illustrated in FIG. 1. More specifically, the recording side of the recording medium 103 (the region in which a metallic image will be formed, hereinafter referred to as the metallic image region) is treated to form an uneven profile, and then an undercoat layer 102 and a metallic ink layer 101 are formed on the recording medium 103. In other words, the side of the recording medium 103 to which the metallic ink will be applied has an uneven profile. Thus, the surface of the metallic image formed on the recording medium 103 follows the uneven profile (uneven surface) of the recording medium 103. Thus the metallic image has an uneven profile 105 corresponding to the uneven profile of the recording medium 103. The uneven profile 105 has a waviness defined by recesses and projections. Accordingly, incoming light rays 112 from a light source 111 are reflected at a projection of the uneven profile 105 in various directions, thus being converted into diffused light rays 113. Consequently, the view angle for metallic color can be expanded.

The waviness of the uneven profile 105 of the metallic image preferably has an average pitch of 1 µm or more, more preferably 10 µm or more, still more preferably 100 µm or more. When the average pitch of the waviness is 1 µm or more, the view angle for the resulting image can be expanded. Also, the average pitch of the waviness is preferably 10000 µm or less, more preferably 2000 µm or less, and still more preferably 500 µm or less. When the average pitch of the waviness is 10000 µm or less, the view angle for the metallic image can be expanded even if the image is a thin line or character formed by applying the metallic ink and the undercoat ink on the recording medium.

The waviness has a difference in height of preferably 0.10 µm or more, more preferably 1 µm or more, still more preferably 5 µm or more, between the top of the projections and the bottom of the recesses. When the difference in height is 0.10 µm or more, the uneven profile 105 has suitable unevenness for wide view angle. Also, the difference in height between the top of the projections and the bottom of the recesses is preferably 1000 µm or less, more preferably 500 µm or less, and still more preferably 300 µm or less. When the difference in the height is 1000 µm or less, the view angle of the image can be expanded even if the image is a thin line or character formed by applying the metallic ink and the undercoat ink on the recording medium.

The arithmetic average surface roughness Ra of the metallic image 101 is preferably 0.20 µm or more, more preferably 0.8 µm or more, and still more preferably 1.5 µm or more. When the arithmetic average surface roughness Ra is 0.20 µm or more, the metallic image can have a wide view angle. Also, the arithmetic average surface roughness Ra of the metallic image 101 is preferably 25.0 µm or less, more preferably 20.0 µm or less, and still more preferably 15.0 µm or less. When the arithmetic average surface roughness Ra is 25.0 µm or less, the view angle of the image can be expanded and the nonuniformity of the metallic color can be reduced, even if the image is a thin line or character formed by applying the metallic ink and the undercoat ink on the recording medium. The average pitch of the waviness, the difference in height between the top of the projections and the bottom of the recesses, and the arithmetic average surface roughness Ra can be estimated using equations based on JIS B 0601: 2001 (Japanese Standards Association).

In this instance, the uneven profile of the recording medium 103 is controlled so that the uneven profile of the resulting metallic image can have a waviness having the above-mentioned dimensions, in view of the thicknesses and materials of the undercoat layer 102 and the metallic ink layer 101. Thus, the metallic ink layer 101 is provided with the uneven profile 105 following the profile of the recording medium 103, so that the dimensions of the waviness of the uneven profile 105 of the metallic ink layer 101 is controlled effectively. Although it is not particularly limited how to provide the recording medium 103 with the uneven profile, the uneven profile may be formed by, for example, adding a resin for forming the uneven profile into the recording medium 103 and forming an ink receiving layer thereon. Alternatively, the uneven profile may be cording side of the recording medium 103.

Any other method may be applied for providing the metallic image with the uneven profile 105, without being limited to the manner illustrated in FIG. 1. For example, an uneven undercoat layer 102 may be formed without preparing an uneven recording medium 103, as shown in FIG. 2. The profile of this undercoat layer 102 is followed by the profile of the metallic image. Thus, the metallic image has the uneven profile 105.

In the case shown in FIG. 2, the waviness of the uneven profile 105 of the metallic image has substantially the same average pitch, difference in height between the top of the projections and the bottom of the recesses and arithmetic average surface roughness Ra as those in the case shown in FIG. 1. In this instance, the uneven profile of the undercoat layer 102 is controlled so that the uneven profile 105 of the resulting metallic image can have a waviness having the above-mentioned dimensions, in view of the thickness and material of the metallic ink layer 101. Thus, the metallic ink layer 101 is provided with the uneven profile 105 following the profile of the undercoat layer 102, so that the dimensions of the waviness of the uneven profile 105 of the metallic ink layer 101 is controlled effectively. Although it is not particularly limited how to provide the undercoat layer 102 with the uneven profile 105, the uneven profile may be formed by, for example, locally varying the amount of the undercoat ink applied. Alternatively, an aggregating component may be added to the undercoat ink. Such an undercoat ink is applied onto the recording medium 103, and then aguegation of the aggregating component is formed at the surface of the undercoat layer 102, thus forming the uneven profile.

Alternatively, the metallic image may be provided with the uneven profile 105, as shown in FIG. 3. Although it is not particularly limited how to provide the metallic image with the uneven profile 105, the uneven profile 105 may be formed by, for example, locally varying the amount of the metallic ink applied. Alternatively, an aggregating component may be added to the metallic ink. Such a metallic ink is applied onto the recording medium 103, and aggregation of the aggregating component is formed, thus forming the uneven profile 105.

In FIGS. 1, 2 and 3, the average pitch of the waviness defined by the projections and recesses at the surface of the metallic image is preferably in the range of 1 µm to 10000 µm. Also, the difference in height between the top of the projections and the bottom of the recesses is preferably in the range of 0.10 µm to 1000 µm. Also, the arithmetic average surface roughness Ra of the metallic image is preferably in the range of 0.20 µm to 25.0 µm.

Instead of the embodiments shown in FIGS. 1, 2 and 3, the image forming method illustrated in FIG. 4 may be applied for expanding the view angle for metallic color. More specifically, the metallic image region at the surface of the recording medium 103 is divided into first areas to which the metallic ink and the undercoat ink will be applied, and second areas to which the third ink will be applied. By coloring the first areas and the second areas with the respective inks, the resulting metallic image have metallic ink portions 101 and third ink portions 106, as shown in FIG. 4. Portions 101 each have been provided with an undercoat layer (portion 102) thereunder in advance. In this structure, when light 112 from a light source 111 is incident on the surface of the recording medium 103 having portions 101, 102 and 106, a metallic color is viewed at portions 101, and diffused light having the same hue as at portions 101 is viewed at portions 106. Thus the colors from these two types of portions expand the view angle for metallic color.

In the embodiment shown in FIG. 4, the second areas account for 3% or more, preferably 5% or more, more preferably 8% or more, of the entire area of the metallic image region. This proportion of the second areas is equivalent to the proportion of the area of portions 106 colored with the third ink in the metallic image. When portions 106 accounts for 3% or more of the entire area of the resulting image, portions 106 can be fully viewed in the image, and thus the view angle can be expanded effectively. Also, the proportion of the area of portions 106 is preferably 97% or less, more preferably 95% or less, and still more preferably 92% or less. When the proportion of the area of portions 106 is 97% or less, portions 101 accounts for a certain proportion or more of the area of the entire image, the resulting image appears satisfactorily metallic-colored.

Portions 106 are separately arranged in the metallic image region of the recording medium 103. FIG. 5 schematically shows portion 101 and portions 106 separately located on the recording medium 103. Although the dimensions and density of portions 106 are not particularly limited, for example, the resulting image may have 7 to 1500 portions 106 per inch on the recording medium. By separately arranging portions 106 at a density of 7 portions or more per inch, nonuniformity of portions 106 is reduced, and thus, portions that cannot appear metallic-colored can be prevented from being formed in the resulting image. Also, by separately arranging portions 106 at a density of 1500 portions or less per inch, each portion 106 has such an area as can be viewed, and thus the view angle can be expanded. The total area of portions 106 and the area of each portion 106 in the resulting image may be appropriately set according to the above-described area proportion and density of portions 106. The area of each portion 106 is not specified. Although the areas of separate portions 106 may be the same as or different from each other, it is advantageous that portions 106 all have the same area from the viewpoint of reducing unevenness of the metallic color. More specifically, the area of portions 106 can be appropriately set according to the resolution of the ink jet printer or the like used in the recording method described below, and may be defined by adjacent dots.

It is not particularly limited how to form separately portion 101 and portions 106 on the surface of the recording medium 103. It may be advantageous to use a dither method. The dither method is a technique in which portion 101 and portions 106 are arranged so as to be viewed as a single face due to illusion of the human eye. Among the techniques of the dither method, the error diffusion technique may be advantageous. This technique can provide images in which unevenness of metallic color is not easily found.

Application of Inks

In the present invention, the metallic ink, the undercoat ink, the third ink may be applied by any method without particular limitation, and a known printing method or image forming method may be used. Examples of such an ink application method include gravure printing, flexography, offset printing, screen printing, relief printing, and on-demand small size printing methods, such as ink jet printing and laser printing. The ink jet printing method can easily apply inks to desired positions on the recording medium, and is thus advantageous.

EXAMPLES

The present invention will be further described in detail with reference to Examples and Comparative Examples. However, the invention is not limited to the following Examples, and is also not particularly limited unless departing from the scope thereof. In the following description, "part(s)" and "%" are on a mass basis unless otherwise specified. In the preparation of the inks, the total content of the constituents in each ink is 100 parts.

Preparation of Metallic Inks

Metallic Ink 1: Aniline-Based Coloring Agent

With a synthesis method described in PTL 3 as a guide, 2,2'-[1,4-phenylenebis[methylene(phenylimino)-4,1-phenylene]]bis-ethylenetricarbonitrile was synthesized. This organic coloring agent and the following constituents were mixed so as to prepare metallic ink 1 having a solid content (coloring agent and polymer dispersant) of 5%.

Styrene-acrylic acid copolymer dispersant (molecular weight: 12000, acid value: 170): 2.5 parts
Glycerol: 10 parts
Acetylenol EH (product name, produced by Kawaken Fine Chemical): 1.0 part
Ion-exchanged water: balance Metallic Ink 2: Pyrrole-Based Coloring Agent With a synthesis method described in PTL 1 as a guide, 2-[5-[1-(4-methylphenyl)-5-(2-thienyl)-1H-pyrrole-2-yl]-2-thienyl]-1,1,2-ethylenetricarbonitrile was synthesized. This organic coloring agent and the following constituents were mixed so as to prepare metallic ink 2 having a solid content (coloring agent and polymer dispersant) of 5%.

Styrene-acrylic acid copolymer dispersant (molecular weight: 12000, acid value: 170): 2.5 parts
Glycerol: 10 parts
Acetylenol EH (product name, produced by Kawaken Fine Chemical): 1.0 part
Ion-exchanged water: balance Metallic Ink 3: Phthalocyanine-Based Coloring Agent CAB-O-JET 450C (produced by CABOT) and the following constituents were mixed so as to prepare metallic ink 3 having a solid content (coloring agent and polymer dispersant) of 8%.

Styrene-acrylic acid copolymer dispersant (molecular weight: 12000, acid value: 170): 4.0 parts
Glycerol: 10 parts
Acetylenol EH (product name, produced by Kawaken Fine Chemical): 1.0 part
Ion-exchanged water: balance Metallic Ink 4: Xanthene-Based Coloring Agent Acid Red 289 (produced by Tokyo Chemical Industry) was mixed with the following constituents to yield metallic ink 4 with an Acid Red 289 content of 8%.

Glycerol: 10 parts
Acetylenol EH (product name, produced by Kawaken Fine Chemical): 1.0 part
Ion-exchanged water: balance Metallic ink 5: Azamethine-Based Coloring Agent With a synthesis method described in Japanese Patent Laid-Open No. 2014-62242 as a guide, (Z)—N-(3-cyano-5-((2-(dibutylamino)-4-phenylthiazole-5-yl)methylene)-2,6-dioxo-4-phenyl-5,6-dihydropyridine-1(2H)-yl)benzamide was synthesized. This organic coloring agent and the following constituents were mixed so as to prepare metallic ink 5 having a solid content (coloring agent and polymer dispersant) of 5%.

Styrene-acrylic acid copolymer dispersant (molecular weight: 12000, acid value: 170): 2.5 parts
Glycerol: 10 parts
Acetylenol EH (product name, produced by Kawaken Fine Chemical): 1.0 part
Ion-exchanged water: balance Preparation of Undercoat Inks Undercoat Ink 1
Commercially available BCI-7eBk black ink (manufactured by Canon) was used.

Undercoat Ink 2
Commercially available BCI-321GY gray ink (manufactured by Canon) was used.

Undercoat Ink 3
Commercially available BCI-7eC cyan ink and BCI-7eY yellow ink (each manufactured by Canon) were used.

Undercoat Ink 4
BCI-7eC cyan ink, BCI-7eY yellow ink, and BCI-7eM magenta ink (each manufactured by Canon) were used.

Image Forming Method

Comparative Example 1

First Ink
Metallic ink 1 was used as a first ink or metallic ink.

Image Forming Procedure
A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink of Comparative Example 1. Then, a 3 cm×3 cm solid pattern was printed on a recording medium, ink jet photo paper (Canon Photo Paper Glossy Professional PR-201).
Evaluation The pattern or image formed by the above-described image forming method was visually observed. Specularly reflected light from the resulting metallic image exhibited a gold color, whereas diffused light, other than the specularly reflected light, exhibited a magenta color. The resulting metallic image was thus unnatural. This image was measured in the specular component exclusive (SCE) mode of a spectrocolorimeter CM-2600d (manufactured by Konica Minolta). The CIE L*a*b* coordinates were L*=32.5, a*=62.1, and b*=22.4 and the hue angle was h=19.8. These results suggest that the diffused light was magenta. The distance from the origin (a*=0, b*=0) in the a*b* plane was 66.0.

Example 1

<First Ink>

The same first ink as in Comparative Example 1 was used as the first ink.

<Undercoat Ink>

Undercoat ink 1 was used as the undercoat ink.

<Image Forming Procedure>

A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 1. Then, a 3 cm×3 cm solid pattern was printed with the undercoat ink on a recording medium, ink jet photo paper (Canon Photo Paper Glossy Professional PR-201). A 3 cm×3 cm solid pattern was further printed with the first ink over the region printed with the undercoat ink.

<Evaluation>

The pattern or image formed by the above-described image forming method was visually observed. Both specularly reflected light and diffused light exhibited a natural gold color, and the resulting image thus appears naturally metallic-colored. This image was measured in the specular component exclusive (SCE) mode of a spectrocolorimeter CM-2600d (manufactured by Konica Minolta). The CIE L*a*b* coordinates were L*=11.2, a*=−0.1, and b*=5.1. These results suggest that magenta diffused light was reduced. (The coatings of the first ink and the undercoat ink had thicknesses of 500 nm and 300 nm, respectively.)

Comparative Example 2

<First Ink>

Metallic ink 2 was used as the first ink or metallic ink.

<Image Forming Procedure>

A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink of Comparative Example 2. Then, a 3 cm×3 cm solid pattern was printed on a recording medium, ink jet photo paper (Canon Photo Paper Glossy Professional PR-201).

<Evaluation>

The pattern or image formed by the above-described image forming method was visually observed. Specularly reflected light from the resulting metallic image exhibited a copper color, whereas diffused light, other than the specularly reflected light, exhibited a cyan color. The resulting metallic image was thus unnatural. This image was measured in the specular component exclusive (SCE) mode of a spectrocolorimeter CM-2600d (manufactured by Konica Minolta). The CIE L*a*b* coordinates were L*=13.9, a*=1.8, and b*=−0.2. These results suggest that the diffused light was cyanic.

Example 2

<First Ink>

Metallic ink 2 was used as the first ink or metallic ink.

<Undercoat Ink>

Undercoat ink 1 was used as the undercoat ink.

<Image Forming Procedure>

A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 2. Then, a 3 cm×3 cm solid pattern was printed with the undercoat ink on a recording medium, ink jet photo paper (Canon Photo Paper Glossy Professional PR-201). A 3 cm×3 cm solid pattern was further printed with the first ink over the region printed with the undercoat ink.

<Evaluation>

The pattern or image formed by the above-described image forming method was visually observed. Both specularly reflected light and diffused light were exhibited a natural copper color, and the resulting image appeared naturally metallic-colored. This image was measured in the specular component exclusive (SCE) mode of a spectrocolorimeter CM-2600d (manufactured by Konica Minolta). The CIE L*a*b* coordinates were L*=13.9, a*=1.8, and b*=0.2. These results suggest that cyanic diffused light was reduced. (The coatings of the first ink and the undercoat ink had thicknesses of 500 nm and 300 nm, respectively.)

Comparative Example 3

<First Ink>

Metallic ink 3 was used as the first ink or metallic ink.

<Image Forming Procedure>

A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink of Comparative Example 3. Then, a 3 cm×3 cm solid pattern was printed on a recording medium, ink jet photo paper (Canon Photo Paper Glossy Professional PR-201).

<Evaluation>

The pattern or image formed by the above-described image forming method was visually observed. Specularly reflected light from the resulting metallic image exhibited a metallic purplish-red color, whereas diffused light, other than the specularly reflected light, exhibited a blue color. The resulting metallic image was thus unnatural. This image was measured in the specular component exclusive (SCE) mode of a spectrocolorimeter CM-2600d (manufactured by Konica Minolta). The CIE L*a*b* coordinates were L*=46.2, a*=−38.7, and b*=−55.9. These results suggest that the diffused light was blue.

Example 3

<First Ink>
Metallic ink 3 was used as the first ink or metallic ink.
<Undercoat Ink>
Undercoat ink 1 was used as the undercoat ink.
<Image Forming Procedure>
A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 3. Then, a 3 cm×3 cm solid pattern was printed with the undercoat ink on a recording medium, ink jet photo paper (Canon Photo Paper Glossy Professional PR-201). A 3 cm×3 cm solid pattern was further printed with the first ink over the region printed with the undercoat ink.
<Evaluation>
The pattern or image formed by the above-described image forming method was visually observed. Both specularly reflected light and diffused light exhibited a naturally metallic purplish-red color, and the resulting image was thus naturally metallic-colored. This image was measured in the specular component exclusive (SCE) mode of a spectrocolorimeter CM-2600d (manufactured by Konica Minolta). The CIE L*a*b* coordinates were L*=12.0, a*=4.2, and b*=−14.7. These results suggest that blue diffused light was reduced. (The coatings of the first ink and the undercoat ink had thicknesses of 500 nm and 300 nm, respectively.)

Comparative Example 4

<First Ink>
Metallic ink 4 was used as the first ink or metallic ink.
<Image Forming Procedure>
A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink of Comparative Example 4. Then, a 3 cm×3 CM solid pattern was printed on a recording medium, ink jet photo paper (Canon Photo Paper Glossy Gold GL-101).
<Evaluation>
The pattern or image formed by the above-described image forming method was visually observed. Specularly reflected light from the resulting metallic image exhibited a metallic green color, whereas diffused light, other than the specularly reflected light, exhibited a magenta color. The resulting metallic image was thus unnatural. This image was measured in the specular component exclusive (SCE) mode of a spectrocolorimeter CM-2600d (manufactured by Konica Minolta). The CLE L*a*b* coordinates were L*=45.8, a*=76.3, and b*=17.4. These results suggest that the diffused light was magenta.

Example 4

<First Ink>
Metallic ink 4 was used as the first ink or metallic ink.
<Undercoat Ink>
Undercoat ink 1 was used as the undercoat ink.
<Image Forming Procedure>
A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 4. Then, a 3 cm×3 cm solid pattern was printed with the undercoat ink on a recording medium, ink jet photo paper (Canon Photo Paper Glossy Gold GL-101). A 3 cm×3 cm solid pattern was further printed with the first ink over the region printed with the undercoat ink.
<Evaluation>
The pattern or image formed by the above-described image forming method was visually observed. Both specularly reflected light and diffused light exhibited a naturally metallic green color, and the resulting image was thus naturally metallic-colored. This image was measured in the specular component exclusive (SCE) mode of a spectrocolorimeter CM-2600d (manufactured by Konica Minolta). The CIE L*a*b* coordinates were L*=11.0, a*=2.2, and b*=9.9. These results suggest that magenta diffused light was reduced. (The coatings of the first ink and the undercoat ink had thicknesses of 500 nm and 300 nm, respectively.)

Comparative Example 5

<First Ink>
Metallic ink 5 was used as the first ink or metallic ink.
<Image Forming Procedure>
A recording head F930 (manufactured by Canon, 6 lines of ejection openings, 512 nozzles for each line, amount of a droplet: 4.0 pL, (constant), maximum resolution: 1200 dpi (lateral)×1200 dpi (vertical)) was used for forming an image. The ink cartridge of the recording head F930 was charged with the first ink of Comparative Example 5. Then, a 3 cm×3 cm solid pattern was printed on a recording medium, ink jet photo paper (Canon Photo Paper Glossy Professional PR-201).
<Evaluation>
The pattern or image formed by the above-described image forming method was visually observed. Specularly reflected light from the resulting metallic image exhibited a metallic gold color, whereas diffused light, other than the specularly reflected light, exhibited a magenta color. The resulting metallic image was thus unnatural. This image was measured in the specular component exclusive (SCE) mode of a spectrocolorimeter CM-2600d (manufactured by Konica Minolta). The CIE L*a*b* coordinates were L*=47.6, a*=80.3, and b*=−31.8. These results suggest that the diffused light was magenta.

Example 5

<First Ink>
Metallic ink 5 was used as the first ink or metallic ink.
<Undercoat Ink>
Undercoat ink was used as the undercoat ink.
<Image Forming Procedure>
A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 5. Then, a 3 cm×3 cm solid pattern was printed with the undercoat ink on a recording medium, ink jet photo paper (Canon Photo Paper Glossy Professional PR-201). A 3 cm×3 cm solid pattern was further printed with the first ink over the region printed with the undercoat ink. After the undercoat ink was applied, the image was measured in the specular component exclusive (SCE) mode of a spectrocolorimeter CM-2600d (manufactured by Konica Minolta). As a result, the lightness L* in the CIE L*a*b* color system was 5.1.

<Evaluation>

The pattern or image formed by the above-described image forming method was visually observed. Both specularly reflected light and diffused light exhibited a naturally metallic gold color, and the resulting image was thus naturally metallic-colored. This image was measured in the specular component exclusive (SCE) mode of a spectrocolorimeter CM-2600d (manufactured by Konica Minolta). The CIE L*a*b* coordinates were L*=16.8, a*=−1.1, and b*=19.2. These results suggest that magenta diffused light was reduced. (The coatings of the first ink and the undercoat ink had thicknesses of 500 nm and 300 nm, respectively.)

Example 6

<First Ink>
Metallic ink 5 was used as the first ink or metallic ink.
<Undercoat Ink>
Undercoat ink 2 was used as the undercoat ink.
<Image Forming Procedure>

A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 6. Then, a 3 cm×3 cm solid pattern was printed with the undercoat ink on a recording medium, ink jet photo paper (Canon Photo Paper Glossy Professional PR-201). A 3 cm×3 cm solid pattern was further printed with the first ink over the region printed with the undercoat ink. After the undercoat ink was applied, the image was measured in the specular component exclusive (SCE) mode of a spectrocolorimeter CM-2600d (manufactured by Konica Minolta). As a result, the lightness L* in the CIE L*a*b* color system was 15.0.

<Evaluation>

The pattern or image formed by the above-described image forming method was visually observed. Both specularly reflected light and diffused light exhibited a naturally metallic gold color, and the resulting image was thus naturally metallic-colored. This image was measured in the specular component exclusive (SCE) mode of a spectrocolorimeter CM-2600d (manufactured by Konica Minolta). The CIE L*a*b* coordinates were L*=18.5, a*=11.4, and b*=6.9. These results suggest that magenta diffused light was reduced. (The coatings of the first ink and the undercoat ink had thicknesses of 500 nm and 300 nm, respectively.)

Example 7

<First Ink>
Metallic ink 5 was used as the first ink or metallic ink.
<Undercoat Ink>
Undercoat ink 2 was used as the undercoat ink.
<Image Forming Procedure>

A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 7. Then, a 3 cm×3 cm pattern with a duty of 40% was printed with the undercoat ink on a recording medium, ink jet photo paper (Canon Photo Paper Glossy Professional PR-201). A 3 cm×3 cm solid pattern was further printed with the first ink over the region printed with the undercoat ink. After the undercoat ink was applied at a duty of 40%, the image was measured in the specular component exclusive (SCE) method of a spectrocolorimeter CM-2600d (manufactured by Konica Minolta). As a result, the lightness L* in the CIE L*a*b* color system was 33.4.

<Evaluation>

The pattern or image formed by the above-described image forming method was visually observed. Although the diffused light slightly exhibited a metallic color, the resulting metallic image ehibited a naturally metallic gold color. This image was measured in the specular component exclusive (SCE) mode of a spectrocolorimeter CM-2600d (manufactured by Konica Minolta). The CIE L*a*b* coordinates were L*=24.9, a*=27.8, and b*=−7.5. These results suggest that magenta diffused light was reduced. (The coatings of the first ink and the undercoat ink had thicknesses of 500 nm and 300 nm, respectively.)

Example 8

<First Ink>
Metallic ink 1 was used as the first ink or metallic ink.
<Undercoat Ink>
Undercoat ink 3 was used as the undercoat ink.
<Image Forming Procedure>

A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 8. The undercoat ink, that is, undercoat ink 3, included two inks. Then, a 3 cm×3 cm pattern was printed with the undercoat ink on a recording medium, ink jet photo paper (Canon Photo Paper Glossy Professional PR-201). For printing with the undercoat ink, BCI-7eC ink was applied at a duty of 100%, and BCI-7eY ink was applied at a duty of 75%. Then, the image was measured in the specular component exclusive (SCE) mode of a spectrocolorimeter CM-2600d (manufactured by Konica Minolta). The CIE L*a*b* coordinates were L*=53.9, a*=−48.8, and b*=−12.4, and the hue angle h was 194.2. Thus, a green undercoat layer was formed. The distance from the origin (a*=0, b*=0) in the a*b* plane was 50.4. A 3 cm×3 cm solid pattern was further printed with the first ink over the region printed with the undercoat ink.

<Evaluation>

The pattern or image formed by the above-described image forming method was visually observed. Both specularly reflected light and diffused light exhibited a naturally metallic gold color, and the resulting image was thus naturally metallic-colored. This image was measured in the specular component exclusive (SCE) mode of a spectrocolorimeter CM-2600d (manufactured by Konica Minolta). The CIE L*a*b* coordinates were L*=22.4, a*=2.0, and b*=1.5. These results suggest that magenta diffused light was reduced. The hue angles of the coatings of the first ink and the undercoat ink of Example 8 were 19.8 degrees and 194.2 degrees, respectively, thus satisfying relational expression (1). The difference in distance from the origin (a*=0, b*=0) in the a*b* plane of the CIE L*a*b* color system between the first ink and the undercoat ink used in Example 8 was 15.6. Thus the relationship $|\{(a_1^*)^2+(b_1^*)^2\}^{1/2}-\{(a_2^*)^2+$ $(b_2^*)^2\}^{1/2}| \leq 30$ held true, wherein $a_2^*$ and $b_2^*$ represent CIE L*a*b* coordinates a* and b* of the opposite color, and $a_1^*$ and $b_1^*$ represent a* and b* coordinates of the first ink.

Comparative Example 6

<First Ink>
Metallic ink 1 was used as the first ink or metallic ink.
<Image Forming Procedure>
A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink of Comparative Example 6. Then, a 3 cm×3 cm solid pattern was printed on a transparent recording medium, two-side printing OHP film 27078 (manufactured by A-One). The transmittance of the transparent recording medium was 90.50%. Such a high transmittance suggests that the amount of light transmitted through the recording medium is larger than that of light reflected from the recording medium.
<Evaluation>
The pattern of the first ink was visually observed from the side to which the first ink had been applied. Specularly reflected light from the resulting metallic image exhibited a gold color, whereas diffused light, other than the specularly reflected light, exhibited a magenta color. The resulting metallic image was thus unnatural. This image was measured in the specular component exclusive (SCE) mode of a spectrocolorimeter CM-2600d (manufactured by Konica Minolta). The CIE L*a*b* coordinates were L*=30.1, a*=66.4, and b*=1.4. These results suggest that the diffused light was magenta.

Example 9

<First Ink>
Metallic ink 1 was used as the first ink or metallic ink.
<Undercoat Ink>
Undercoat ink 1 was used as the undercoat ink.
<Image Forming Procedure>
A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 9. Then, a 3 cm×3 cm solid pattern was printed on one side of a transparent recording medium, two-side printing OHP film 27078 (manufactured by A-One). Subsequently, a 3 cm×3 cm solid pattern was printed with the first ink on the other side of the transparent recording medium so as to cover the region printed with the undercoat ink with the OHP film therebetween.
<Evaluation>
The resulting pattern was visually observed from the side to which the first ink had been applied. As a result, it was confirmed that a metallic gold-colored image had been produced. This image was measured in the specular component exclusive (SCE) mode of a spectrocolorimeter CM-2600d (manufactured by Konica Minolta). The CIE L*a*b* coordinates were L*=22.2, a*=−0.1, and b*=5.1. These results suggest that magenta diffused light was reduced. (The coatings of the first ink and the undercoat ink had thicknesses of 500 nm and 300 nm, respectively.)

Comparative Example 7

<First Ink>
Metallic ink 2 was used as the first ink.
<Image Forming Procedure>
A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink of Comparative Example 7. Then, a 3 cm×3 cm solid pattern was printed on a transparent recording medium, two-side printing OHP film 27078 (manufactured by A-One).
<Evaluation>
The pattern of the first ink was visually observed from the side to which the first ink had been applied. Specularly reflected light from the resulting metallic image exhibited a copper color, whereas diffused light, other than the specularly reflected light, exhibited a cyan color. The resulting metallic image was thus unnatural. This image was measured in the specular component exclusive (SCE) mode of a spectrocolorimeter CM-2600d (manufactured by Konica Minolta). The CIE L*a*b* coordinates were L*=26.3, a*=−4.4, and b*=−6.7. These results suggest that the diffused light was cyanic.

Example 10

<First Ink>
Metallic ink 2 was used as the first ink or metallic ink.
<Undercoat Ink>
Undercoat ink 1 was used as the undercoat
<image Forming Procedure>
A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 10. Then, a 3 cm×3 cm solid pattern was printed on one side of a transparent recording medium, two-side printing OHP film 27078 (manufactured by A-One). Subsequently, a 3 cm×3 cm solid pattern was printed with the first ink on the other side of the transparent recording medium so as to cover the region printed with the undercoat ink with the OHP film therebetween.
<Evaluation>
The resulting pattern was visually observed from the side to which the first ink had been applied. As a result, it was confirmed that a metallic copper-colored image had been produced. This image was measured in the specular component exclusive (SCE) mode of a spectrocolorimeter CM-2600d (manufactured by Konica Minolta). The CIE L*a*b* coordinates were L*=23.9, a*=1.9, and b*=−0.2. These results suggest that cyanic diffused light was reduced. (The coatings of the first ink and the undercoat ink had thicknesses of 500 nm and 300 nm, respectively.)

Example 11

<First Ink>
Metallic ink 1 was used as the first ink or metallic ink.
<Undercoat Ink>
Undercoat ink 1 was used as the undercoat ink.

<Image Forming Procedure>

A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 11. Then, a 3 cm×3 cm solid pattern was printed with the undercoat ink on a recording medium, ink jet photo paper Fine Surface Glossy Paper Luster (manufactured by Canon). A 3 cm×3 cm solid pattern was further printed with the first ink over the region printed with the undercoat ink. The resulting pattern or image had an uneven profile with a waviness having an average pitch of 200 µm and a difference in height of 20 µm between the top of projections and the bottom of recesses, and an arithmetic average surface roughness Ra of 2.15 µm.

<Evaluation>

The pattern or image formed by the above-described image forming method was visually observed. Reflected light other than specularly reelected light also exhibited a gold color, and thus the gold color of the image was viewed at a wide range of view angles. This image was measured with a goniospectrophotometer (GSP-2, manufactured by Murakami Color Research Laboratory). The color viewed in the direction of specular reelection was satisfactorily metallic-colored, and when the image was viewed at angles of ±35 degrees with respect to the direction of specular reflection was gold-colored. When the image of Example 1 was measured in the same manner for comparison, the image viewed at angles of ±5 degrees with respect to the direction of specular reflection appeared gold-colored. Thus, the present Example formed an image that can appear gold-colored at a wider range of view angles. (The coatings of the first ink and the undercoat ink had thicknesses of 500 nm and 300 nm, respectively.)

Example 12

<First Ink>

Metallic ink 1 was used as the first ink or metallic ink.

<Undercoat Ink>

Undercoat ink 1 was used as the undercoat ink.

<Third Ink>

Commercially available BCI-7eY yellow ink (manufactured by Canon) was used as the third ink.

<Image Forming Procedure>

A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink, undercoat ink and third ink of Example 12, and an ink jet photo paper, Glossy Professional PR-201 (manufactured by Canon) was prepared as the recording medium. A 3 cm×3 cm metallic image region was determined on the recording medium, and the third ink was applied by an error diffusion technique so that 150 portions per inch were printed with an area of 20% in the image region. Subsequently, the undercoat ink was applied to the region of the metallic image region other than the portions printed with the third ink, and the first ink was applied over the region to which the undercoat ink had been applied, thus forming a metallic image.

<Evaluation>

The image formed by the above-described image forming method was visually observed. Specularly reflected light had a metallic gold color, and reflected light other than specularly reflected light exhibited a yellow color having the same hue as gold. Thus the image appeared gold at a wide range of view angles. This image was measured in the specular component exclusive (SCE) mode of a spectrocolorimeter CM-2600d (manufactured by Konica Minolta). As a result, the CIE Lab chromaticity coordinates a* and b* were −1.8 and 27.2, respectively. The image of Example 1 had CIE L*a*b* chromaticity coordinates of a*=−0.13 and b*=5.1, and diffused light therefrom exhibited a yellow color having a hue equivalent to that of gold. Thus, the present Example formed an image that can appear gold-colored at a wider range of view angles. (The coatings of the first ink and the undercoat ink had thicknesses of 500 nm and 300 nm, respectively.)

Example 13

<First Ink>

Metallic ink 1 was used as the first ink or metallic ink.

<Undercoat Ink>

Undercoat ink 4 was used as the undercoat ink.

<Image Forming Procedure>

A recording head F930 (manufactured by Canon, 6 lines of ejection openings, 512 nozzles for each line, amount of a droplet: 4.0 pL (constant), maximum resolution: 1200 dpi (lateral)×1200 dpi (vertical)) was used for forming an image. The ink cartridge of the recording head F930 was charged with the first ink and undercoat ink of Example 13. The undercoat ink, that is, undercoat ink 4, included three inks. Then, a 3 cm×3 cm pattern was printed with the undercoat ink on a recording medium, ink jet photo paper (Canon Photo Paper Glossy Professional PR-201), For printing with the undercoat ink, BCI-7eC ink, BCI-7eY ink and BCI-7eM ink were each applied at a duty of 60%. Then, a 3 cm×3 cm solid pattern was further printed with the first ink over the region printed with the undercoat ink, After the undercoat ink was applied, the image was measured in the specular component exclusive (SCE) mode of a spectrocolorimeter CM-2600d (manufactured by Konica Minolta). As a result, the lightness L* in the CIE L*a*b* color system was 14.2.

<Evaluation>

The pattern or image formed by the above-described image forming method was visually observed. Both specularly reflected light and diffused light exhibited a natural gold color, and the resulting image thus appears naturally metallic-colored. This image was measured in the specular component exclusive (SCE) mode of a spectrocolorimeter CM-2600d (manufactured by Konica Minolta), The CIE L*a*b* coordinates were L*=11.9, a*=−0.3, and b*=6.1. These results suggest that magenta diffused light was reduced. (The coatings of the first ink and the undercoat ink had thicknesses of 500 nm and 350 nm, respectively.)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-100459, filed May 14, 2014, which is hereby incorporated by reference herein in its entirety.

The invention claimed is:

1. A metallic image forming method for forming an image having a metallic hue derived from an organic coloring agent, the method comprising:

preparing a metallic ink containing the organic coloring agent, preparing a recording medium provided with an undercoat layer thereon having (i) a black color for absorbing diffusion light of the metal particles or (ii) an opposite color to the color of diffused light from the organic coloring agent for cancelling the diffusion light of the organic coloring agent, and printing with the metallic ink onto the recording medium so as to cover at least part of the undercoat layer, wherein the undercoat layer has the opposite color to the color of diffused light from the organic coloring agent, and wherein the ink having the opposite color to the color of the diffusion light from the organic coloring agent contains a coloring material capable of exhibiting the opposite color to the color of diffused light from the organic coloring agent.

2. The metallic image forming method according to claim 1, wherein the undercoat layer having the opposite color is formed by applying an undercoat ink onto the recording medium, the undercoat ink having an opposite color to the color of diffused light from the organic coloring agent.

3. The metallic image forming method according to claim 1, wherein the black color absorbs light having wavelengths over the entire range of 380 nm to 780 nm and has a lightness L* of 35 or less in the CIE L*a*b* color system.

4. The metallic image forming method according to claim 1, wherein the opposite color satisfies the following relationship:

hue angle of diffused light from an image formed with the metallic ink+162°≤hue angle of diffused light from an image formed with the opposite color≤hue angle of diffused light from the image formed with the metallic ink+198°.

5. The metallic image forming method according to claim 1, wherein the metallic image has an uneven profile having an waviness including recesses and projections, and the waviness has an average pitch in the range of 1 μm to 10000 μm, a difference in height between the bottom of the recesses and the top of the projections in the range of 0.10 μm to 1000 μm, and an arithmetic average surface roughness Ra in the range of 0.20 μm to 25.0 μm, the average pitch, the difference in height, and the arithmetic average surface roughness each being specified in JIS B0601:2001.

6. The metallic image forming method according to claim 1, wherein the metallic ink is printed onto the recording medium using an ink jet recording head.

7. The metallic image forming method according to claim 2, wherein the ink having an opposite color to the color of diffused light from the organic coloring agent is applied onto the recording medium using an ink jet recording head.

8. The metallic image forming method according to claim 1, wherein the recording medium is opaque, and the printing with the metallic ink is performed in such a manner that the metallic ink is printed to the side of the recording medium on which the undercoat layer has been formed.

9. The metallic image forming method according to claim 1, wherein the recording medium is transparent, and the printing with the metallic ink is performed in such a manner that the metallic ink is printed to the side of the recording medium opposite the undercoat layer.

10. The metallic image forming method according to claim 1, wherein the undercoat layer has the black color.

11. The metallic image forming method according to claim 10, wherein the undercoat layer having the black color is formed by applying a black ink onto the recording medium or mixing a yellow ink, a magenta ink, and a cyan ink onto the recording medium.

12. The metallic image forming method according to claim 11, wherein the black ink is applied onto the recording medium using an ink jet recording head.

13. The metallic image forming method according to claim 11, wherein the thickness of a layer derived from the ink forming the undercoat layer is 0.05 μm or more to 1 μm or less.

14. The metallic image forming method according to claim 1, wherein the thickness of a layer derived from the metallic ink formed on the recording medium is 0.05 μm or more to 1 μm or less.

15. The metallic image forming method according to claim 1, wherein the recording medium is a surface-treated permeable medium.

16. The metallic image forming method according to claim 15, wherein the permeable medium is selected from the group consisting of plain paper, coat paper, art paper, and cast-coated paper.

17. The metallic image forming method according to claim 1, wherein the printing with the ink is performed by a printing method selected from the group consisting of gravure printing, flexography, offset printing, screen printing, relief printing, and on-demand small size printing.

18. The metallic image forming method according to claim 1, wherein the organic coloring agent is selected from the group consisting of an aniline-based coloring agent, a pyrrole-based coloring agent, a phthalocyanine-based coloring agent, a xanthene-based coloring agent, and an azamethine-based coloring agent.

19. The metallic image forming method according to claim 18, wherein the organic coloring agent is the aniline-based coloring agent, and the undercoat layer is formed by applying the cyan ink and the magenta ink onto the recording medium.

20. The metallic image forming method according to claim 18, wherein the organic coloring agent is the azamethine-based coloring agent, and the undercoat layer is formed by applying a gray ink onto the recording medium.

* * * * *